(No Model.)
S. G. McFARLAND.
CONNECTION FOR PIPES TO CLOSETS, &c.
No. 330,502. Patented Nov. 17, 1885.
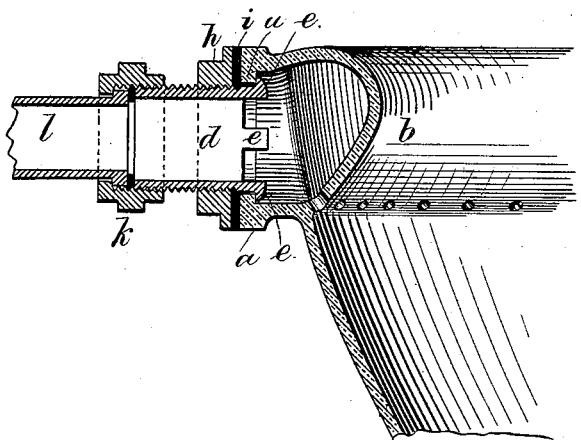
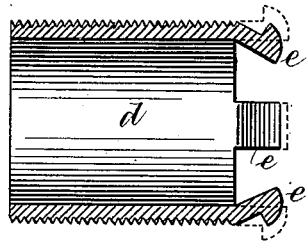
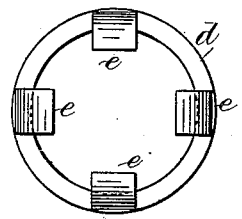
Witnesses
Chas. H. Smith
J. Haily
Inventor
Samuel G. McFarland
per Lemuel W. Serrell
Atty

UNITED STATES PATENT OFFICE.

SAMUEL G. McFARLAND, OF NEW YORK, N. Y., ASSIGNOR TO MYERS SANITARY DEPOT, OF SAME PLACE.

CONNECTION FOR PIPES TO CLOSETS, &c.

SPECIFICATION forming part of Letters Patent No. 330,502, dated November 17, 1885.

Application filed July 31, 1885. Serial No. 173,129. (No model.)

*To all whom it may concern:*

Be it known that I, SAMUEL G. McFARLAND, of the city, county, and State of New York, have invented an Improvement in Connections for Pipes to Closets, Basins, &c., of which the following is a specification.

The supply water-pipe for water-closets has been connected to the basin by a lock similar to a bayonet-lock. In this case, however, the parts are liable to become separated in consequence of the thimble with the locking-studs being rotated in screwing up the coupling of the water-pipe.

My improvement is made for permanently connecting the coupling-thimble to the bowl or basin of a water-closet or other article, especially under circumstances where access can only be obtained for introducing the coupling-thimble at one side—such, for instance, as the flushing-rim of a water-closet.

In the drawings, Figure 1 represents the connection as applied to the flushing-rim of a water-closet. Fig. 2 is a section, and Fig. 3 an end view of the coupling-thimble detached and in larger size.

At the place where the pipe is to be attached a flange, $a$, is provided, said flange extending inwardly. A flange of this kind has been made use of for the waste-pipe at the bottom of a wash-basin; but in that case the coupling-thimble is made with a complete flange upon its upper end, because said coupling-thimble can be passed down from above with its flange resting upon the inward flange at the bottom of the basin.

In occasions where my present improvement is available the coupling-thimble has to be passed into the inward flange $a$ at the side from which the pipe leads away because the other side of said flange is wholly or partially covered by the wall $b$ of the water-way or the fan or other device existing at the inlet-pipe of closet-basins or similar articles.

Upon the coupling-thimble $d$, I provide hooks $e$, that project from the end, and these hooks stand at an inward inclination, as seen at Fig. 2, so that the coupling-thimble can easily be passed into the opening within the flange $a$, after which the hooks $e$ are bent outwardly to catch over the inner edges of the flange $a$, as seen in Fig. 1. These hooks are to be bent outwardly by any suitable tool. I prefer to use a tool formed of two arms jointed together, similar to a glove-stretcher, only the same is of metal and of sufficient strength. By this means the thimble $d$ is securely hooked behind the flange $a$, so that the parts cannot become separated and the joints between the thimble $d$ and the bowl or basin are made water-tight by a lock-nut, $h$, and washer $i$, of india-rubber or other suitable material, the said nut $h$ being screwed upon the outside of the coupling $d$, and the washer clamped thereby against the flange $a$. The union $k$ or other connection for the water-pipe $l$ is screwed upon the thimble $d$, connecting the water-pipe $l$ with the said thimble $d$.

I am aware that pipes have been secured into sockets by swelling the metal into recesses in the socket, and that couplings have been connected to basins and sockets by hooks and screws.

I claim as my invention—

The combination, with the inward flange $a$, of the screw-threaded thimble $d$, having the hooks $e$, formed with and projecting at one end from the thimble, so as to be introduced within the flange $a$ and spread outwardly, and the nut $h$, and washer $i$, upon the outside of the thimble, substantially as set forth.

Signed by me this 27th day of July, 1885.

SAMUEL G. McFARLAND.

Witnesses:
  GEO. T. PINCKNEY,
  WILLIAM G. MOTT.